May 20, 1952 D. B. HUNTTING 2,597,489
BODY FOR A CHUCK HAVING RADIALLY MOVABLE JAWS
Filed Feb. 10, 1949 3 Sheets-Sheet 1
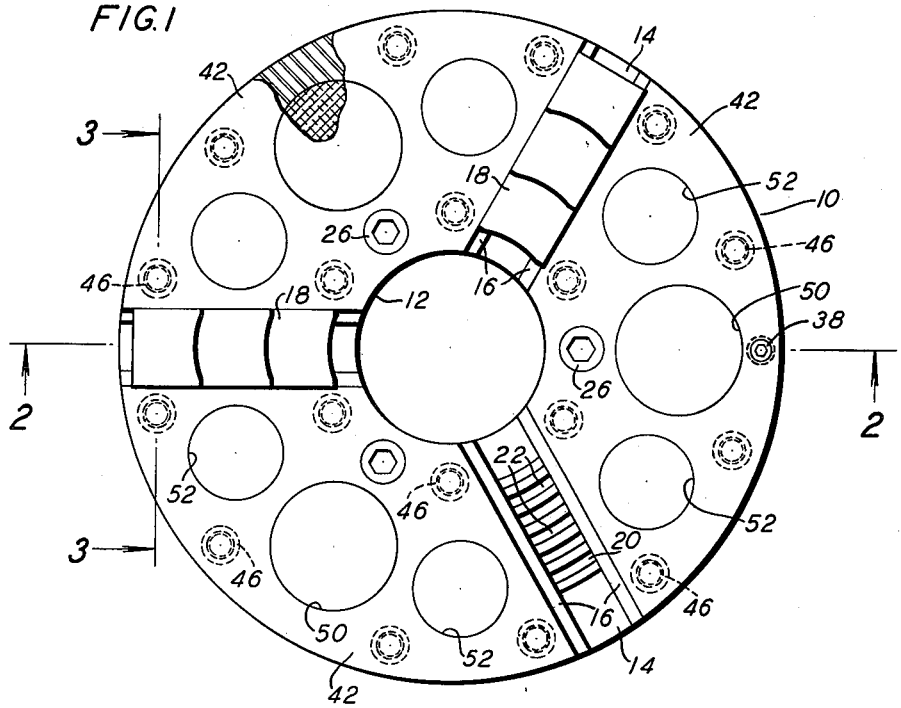
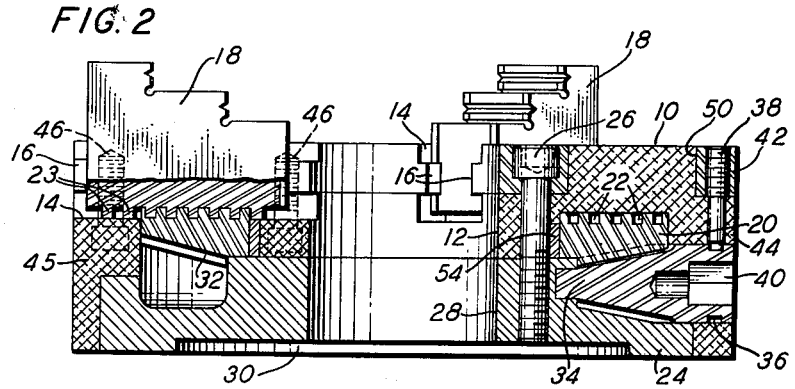
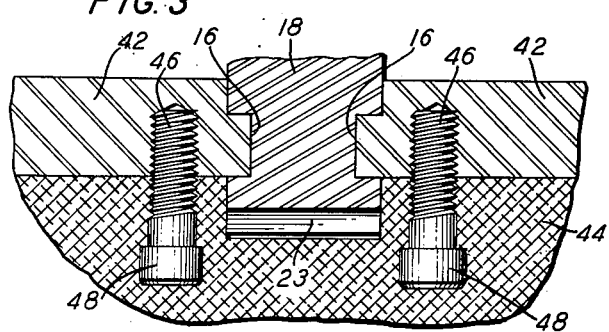
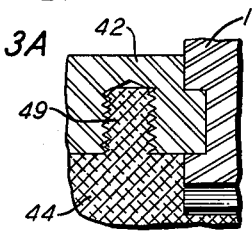
INVENTOR
DONALD B. HUNTTING
BY S. Jay Teller
ATTORNEY May 20, 1952 D. B. HUNTTING 2,597,489
BODY FOR A CHUCK HAVING RADIALLY MOVABLE JAWS
Filed Feb. 10, 1949 3 Sheets-Sheet 2
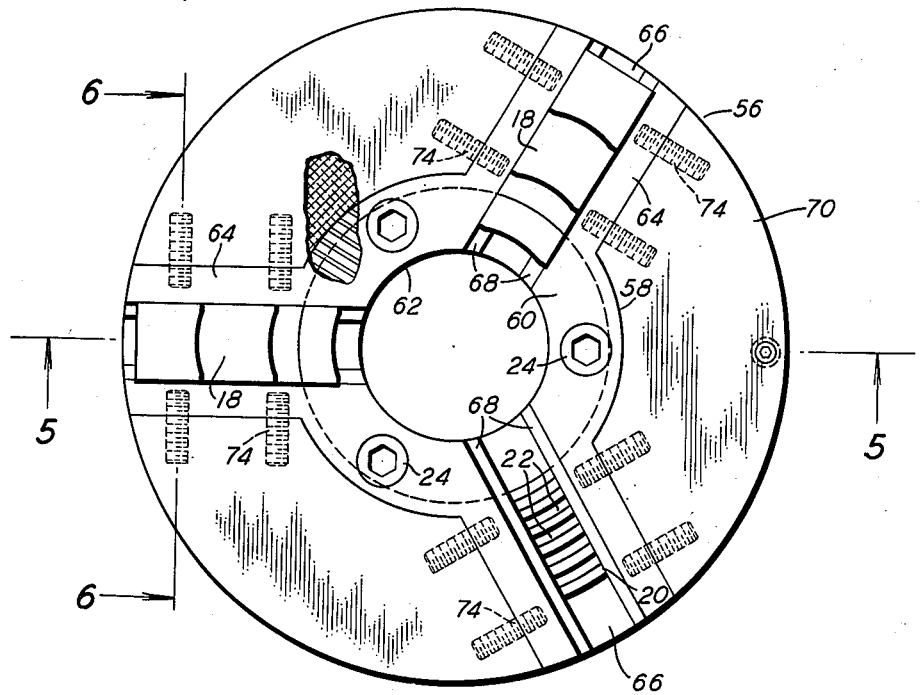
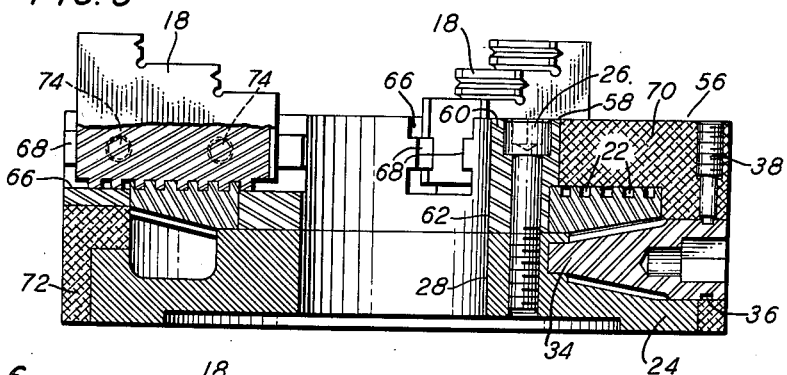
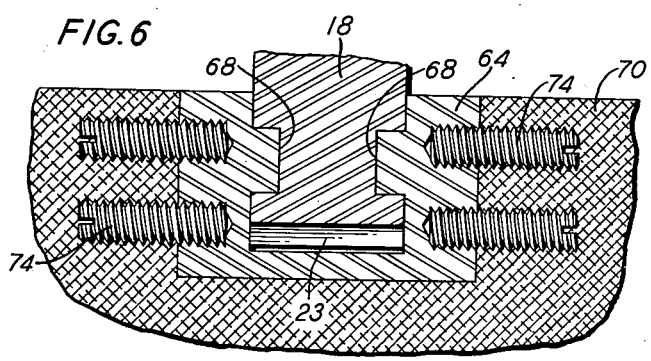
INVENTOR
DONALD B. HUNTTING
BY S. Jay Teller
ATTORNEY May 20, 1952   D. B. HUNTTING   2,597,489
BODY FOR A CHUCK HAVING RADIALLY MOVABLE JAWS
Filed Feb. 10, 1949   3 Sheets-Sheet 3
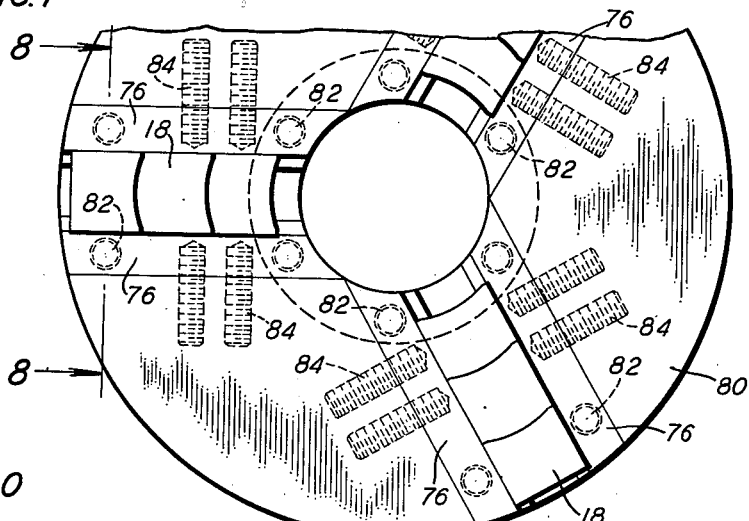
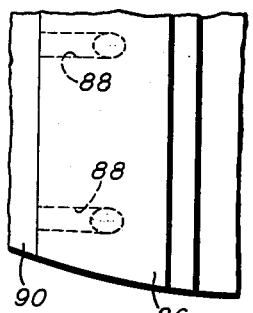
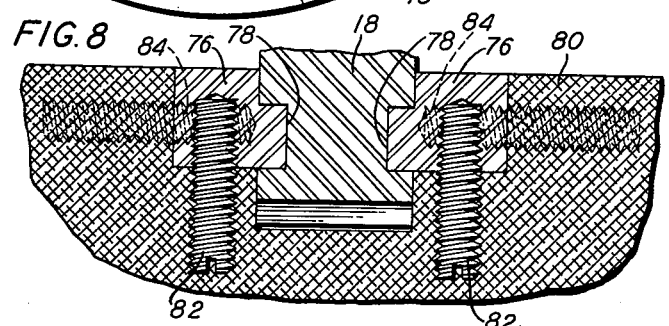
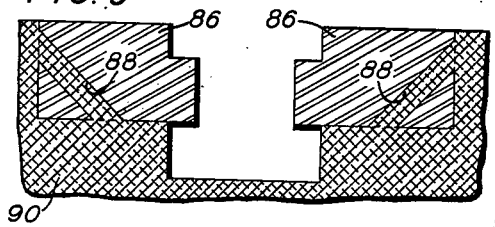
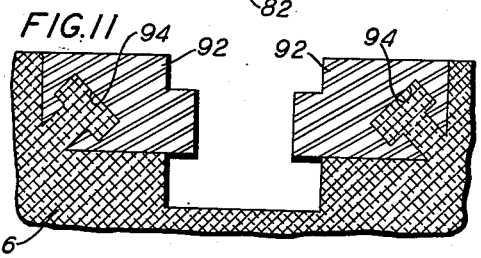
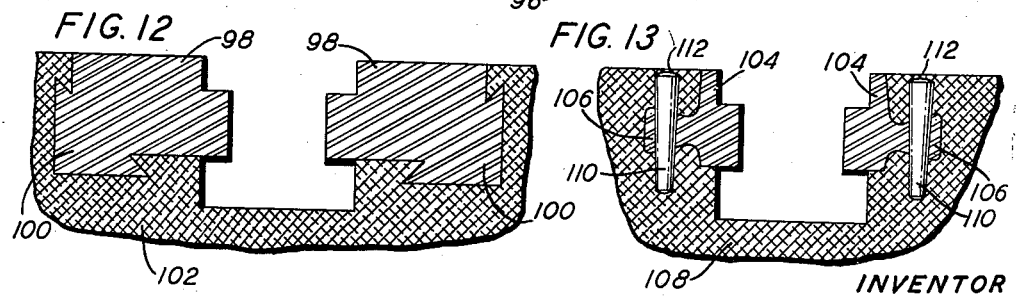
INVENTOR
DONALD B. HUNTTING
BY S. Jay Teller
ATTORNEY Patented May 20, 1952

2,597,489

UNITED STATES PATENT OFFICE 2,597,489

BODY FOR A CHUCK HAVING RADIALLY MOVABLE JAWS

Donald B. Huntting, West Hartford, Conn., assignor to The E. Horton & Son Company, Windsor Locks, Conn., a corporation of Connecticut Application February 10, 1949, Serial No. 75,617

19 Claims. (Cl. 279—114)

The general object of the present invention is to provide an improved body for a chuck of the type commonly used for holding work pieces while machining operations are performed thereon. Such a chuck is provided with a plurality of work engaging jaws, usually three in number, these jaws being movable radially to engage and hold the work piece to be machined. A chuck of this type is ordinarily used on a lathe or other machine which rotates the chuck and the work piece held thereby.

Chucks of the type described must be manually handled while being put in place on the lathe or other machine and while being removed therefrom, and for this reason the weight of the chuck should desirably be kept at a minimum. Furthermore, such chucks are frequently rotated at high speeds and rapid acceleration and deceleration is advantageous. For this reason also it is desirable that the chuck have a minimum weight or mass.

In accordance with the invention, the parts of the chuck body requiring hardness and strength are formed of a suitable metal, such as steel, and the remainder of the chuck body is formed of a lighter metal, such as an aluminum alloy or a magnesium alloy, the last said metal being cast in place to engage and interlock with the first said parts. The resultant chuck body is much lighter than a conventional chuck body formed entirely of steel, but it nevertheless has the necessary hardness and strength where required.

In the accompanying drawings I have shown several embodiments of the invention, but it will be understood that the drawings are intended for illustrative purposes only and are not to be construed as defining or limiting the scope of the invention, the claims forming a part of this specification being relied upon for that purpose.

Of the drawings:

Fig. 1 is a front view of a chuck having a chuck body embodying the invention, one of the chuck jaws being omitted.

Fig. 2 is a transverse sectional view taken along the line 2—2 of Fig. 1.

Fig. 3 is a fragmentary sectional view taken along the line 3—3 of Fig. 1.

Fig. 3A is a view similar to the left portion of Fig. 3, but showing an alternative construction.

Fig. 4 is a view similar to Fig. 1 but showing an alternative chuck body embodying the invention.

Fig. 5 is a transverse sectional view taken along the line 5—5 of Fig. 4.

Fig. 6 is a fragmentary sectional view taken along the line 6—6 of Fig. 4.

Fig. 7 is a fragmentary front view similar to Figs. 1 and 4 but showing another alternative chuck body embodying the invention.

Fig. 8 is a fragmentary sectional view taken along the line 8—8 of Fig. 7.

Fig. 9 is a fragmentary sectional view similar to Fig. 8 with the jaw omitted, but showing another alternative embodiment of the invention.

Fig. 10 is a fragmentary plan view of the left portion of Fig. 9.

Figs. 11, 12 and 13 are fragmentary sectional views similar to Fig. 9 but showing still other embodiments of the invention.

The chuck as shown in Figs. 1 to 3 of the drawings is or may be of conventional construction except as to the chuck body which will be hereinafter described in detail. The chuck comprises a generally cylindrical body indicated at 10, this having a cylindrical outer wall or face and a flat front face. The chuck body has a central opening 12 extending entirely therethrough and concentric with the peripheral cylindrical wall. The chuck body has a plurality of radial grooves 14, 14, ordinarily three, the sides of the grooves being formed to constitute guideways 16, 16 for holding and guiding radially movable work engaging jaws 18, 18. Ordinarily and as shown, each jaw 18 is provided with longitudinal grooves into which fit tongues at the sides of the grooves 14, 14, these tongues constituting parts of the guideways 16, 16 for the jaws.

Means is provided for moving or adjusting the jaws 18, 18 radially along the grooves 14, 14. This means may be widely varied, as the invention is applicable generally to chucks having radially movable jaws. Any usual or preferred jaw moving or adjustment means may be used, and one such moving or adjusting means is shown as an example. As shown, there is an annular scroll member 20 which is entered in an annular recess in the chuck body, the said annular recess being open at the rear to receive the scroll member. In accordance with conventional practice the forward face of the scroll member 20 is provided with a plurality of spiral grooves 22, 22 and the rear face of each chuck jaw 18 is provided with rearward projecting teeth 23 which are shaped to enter and fit the spiral grooves 22 in the scroll member 20. When the scroll member 20 is rotated the jaws 18, 18 are moved radially inward or outward in unison.

The chuck body 10 is provided at its rear with a large circular recess in which is fitted a rear plate 24, the plate 24 being connected with the body by any suitable means such as screws 26, 26. The plate 24 has a central opening 28 which registers with the central opening 12 in the chuck body and the said plate 24 otherwise completely closes the chuck at the rear. The plate 24 may have a recess 30 which is used in the mounting of the chuck on a lathe face plate or otherwise. The mounting means for the chuck is not fully shown as it does not constitute any part of the present invention.

The scroll member is provided at its rear with bevel gear teeth 32 which mesh with teeth formed on a bevel pinion 34 rotatable about a radial axis. The bevel pinion 34 is rotatably supported at its inner end in a bearing aperture in the rear plate 24 and is rotatably supported at its outer end in a bearing aperture in the body 10. The pinion 34 has a circumferential groove 36 and a screw 38 is provided which is entered in a threaded aperture in the body 10. The end of the screw 38 enters the circumferential grooves 36 in the bevel pinion to prevent the pinion from moving longitudinally. The pinion 34 has a socket opening 40 therein for receiving a wrench by means of which the bevel pinion can be turned to rotate the scroll member 20 and thus move the jaws 18, 18.

In accordance with the invention the chuck body 10 includes a jaw engaging structure at the front of which at least the major portion is formed of a hard relatively heavy material and is provided with the before-mentioned guideways 16, 16. The chuck body also includes a peripherally cylindrical main member formed of a metal substantially lighter, and ordinarily softer, than the metal of the major portion of the jaw engaging structure, the metal of the main member being cast in place to provide interlocking integral engagement with the said jaw engaging structure so that the said jaw engaging structure and the said main member are permanently held in fixed relationship with each other. The guideways of the jaw engaging structure are generally radial and their outer ends are at the periphery of the body. The cast main member includes a continuous peripherally cylindrical annular portion behind the jaw engaging structure, this annular portion cooperating to provide the outer cylindrical wall of the body.

In completing the chuck body the jaw engaging structure is placed and located in a suitable mold or die, the said die being shaped to conform to the surfaces of the main member to be cast. Then the molten metal for the main member is poured or forced into the die in accordance with usual die casting practice, the metal upon solidifying having the shape of the die and being engaged with the jaw engaging structure.

The before-mentioned jaw engaging structure may be widely varied as to details of construction but it necessarily includes oppositely disposed complemental guideways such as 16, 16 for the chuck jaws. As shown in Figs. 1 to 3, the jaw engaging structure comprises three similar separate sectoral jaw engaging members 42, 42 which are formed with the guideways 16, 16 at their adjacent edge faces. The members 42, 42 are of such size and shape and are so spaced as to provide the proper spacing between the guideways 16, 16. The main member 44 is cast in place as already stated and it interlocks with the members 42, 42 constituting the major portion of the jaw engaging structure in such a manner that the said members are permanently held in fixed relationship with each other and with the main member. The main member 44 includes a continuous annular portion 45 behind the jaw engaging members 42, 42. As will be observed in Fig. 3, each groove 16 for receiving a jaw 18 is partly between the jaw engaging members 42, 42 and is formed partly within the cast main member 44. The front faces of the members 42, 42 constitute portions of the front face of the chuck body.

The interlocking engagement between the jaw engaging members 42, 42 and the main member 44 may be variously provided but as shown particularly in Figs. 1 and 3 the members 42 carry anchoring studs 46, 46 which project rearward therefrom. As shown in Fig. 1, there are six studs 46, 46 for each member 42, the said figure showing one advantageous arrangement of the said studs. It will be understood, however, that the number of studs and the arrangement thereof may be widely varied. The studs, whether arranged as shown in Figs. 1 to 3 or otherwise, are connected with the jaw engaging member or members prior to the casting of the main body member and they will therefore be regarded as constituting portions of the jaw engaging structure. Each stud 46 is shown as entered in a threaded hole in the corresponding member 42 which hole is closed at the front. As shown, each stud has a head 48 at the rearward end thereof. In lieu of the headed studs as shown, headless studs may be provided as illustrated in connection with other embodiments of the invention hereinafter described. The studs 46, 46, whether headed or headless, provide the jaw engaging structure or members with surfaces spaced from the guideways 16, 16 and positioned for interlocking engagement with the metal of the cast main member 44. As the metal of the main body 44 is cast in place it flows around the projecting portions of the studs 46, 46 and engages and fits the surfaces thereof. When the metal of the body member solidifies it is firmly engaged with the studs and the members 42, 42 are thus held in fixed relationship with each other and in permanent interlocking engagement with the body member.

Fig. 3A illustrates the fact that one or more of the studs 46, 46 may be omitted, the metal of the main member 44 being caused to flow into and fill the threaded hole 49 in the corresponding jaw engaging member 42. The threads in the hole 49 provide the necessary surfaces for engagement with the main member. Studs such as 46, 46 may be combined with threaded holes such as 49 for holding the same jaw engaging member.

Preferably and as shown, each jaw engaging member 42 is provided with a plurality of relatively large openings 50 and 52, 52, these openings extending entirely through the members 42 from front to rear thereof. When the main member 42 is cast in place the metal thereof flows into the openings 50 and 52, 52 to entirely fill them, the metal within the said openings constituting portions of the aforesaid main member.

The before-mentioned annular recess for the scroll member 20 is formed within the main member 44 of the chuck body. In view of the fact that the metal of the main member 44 is relatively soft a ring 54 formed of a harder metal such as steel is placed at the inner edge of the recess so as to provide a harder bearing surface for the rotative movement of the scroll member. Preferably the ring 54 is put in place prior to the casting of the main member 44 so that the metal of the main member is cast around the ring.

The holes for the screws 26 which connect the chuck body with the rear plate 24 may be formed during the casting of the main member 44. However, this is not essential and the holes for these screws may be formed subsequently by drilling.

From the foregoing description it will be apparent that a chuck body embodying the invention is considerably lighter than would otherwise be possible. The major portion of the jaw engaging structure comprising the members 42, 42 is formed of a relatively hard material such as steel which is relatively heavy. Thus the portions of the chuck body at the guideways 16, 16 are strong and can be made as hard as may be desirable. The main member of the chuck body which is cast in place may be formed of any suitable relatively light metal such as aluminum alloy or a magnesium alloy. This relatively light metal is not as hard or as strong as the steel members 42, 42 but it is sufficiently hard and sufficiently strong to serve the purposes for which it is intended.

Figs. 4 to 6 show a chuck provided with an alternative body 56 embodying the invention. The details of the chuck, except the body thereof, are or may be the same as already described.

The major portion of the jaw engaging structure of the body 56, instead of comprising a plurality of separate jaw engaging members, comprises a single unitary jaw engaging member 58 formed of steel or other suitable metal. The member 58 includes a hub 60 having a central opening 62 corresponding to the opening 12. The member 58 also includes a plurality of integral radial arms 64, 64, three such arms being ordinarily provided. The ends of the arms 64, 64 are arcuate to conform to the periphery of the completed chuck body. The arms 64, 64 are provided with grooves 66, 66 similar to the grooves 14, 14, these grooves extending through the hub 60. Guideways 68, 68 are formed at the edge faces of the grooves, these being similar to the guideways 16, 16. As will be observed in Fig. 6, each groove 66 for receiving a jaw 18 is entirely within the corresponding arm 64 and in the hub 60. The front face of the jaw engaging member 58 constitutes a portion of the front face of the chuck body.

The chuck body 56 also includes a main member 70 which is cast in place and interlocks with the jaw engaging member 58 in such manner that the said member 58 and the said member 70 are permanently held in fixed relationship with each other. The metal of the main member 70 is or may be the same as that of the main member 44. The member 70 fills the spaces between the arms 64, 64 and includes a continuous annular portion 72 behind the arms 64, 64. The front face of the main member 70 is flush with the front face of the jaw engaging member 58.

The interlocking engagement between the jaw engaging member 58 and the main member 70 may be variously provided but as shown, particularly in Figs. 4 and 6, the arms 64, 64 carry oppositely projecting anchoring threaded studs 74, 74, these studs being entered in threaded holes in the arms. The studs 74, 74 provide the jaw engaging member 58 with surfaces spaced from the guideways 68, 68 and positioned for interlocking engagement with the metal of the main member 70. As the metal of the main member 70 is cast in place it flows around the projecting portions of the studs 74, 74 and fits the surfaces thereof. When the metal of the body solidifies it is firmly engaged with the studs and the member 58 is thus held in fixed relationship with the main member. One or more of the studs 74, 74 may be omitted and the metal of the main member may be caused to flow into and fill the threaded holes as illustrated in Fig. 3A.

As shown in Fig. 5, the hub 60 provided a bearing for the scroll member 20. It is therefore unnecessary to provide a separate bearing ring such as the ring 54 shown in Fig. 2.

The chuck body shown in Figs. 7 and 8 is in many respects similar to that shown in Figs. 1 to 3, but it differs primarily in that the jaw engaging structure comprises a plurality of pairs of separate jaw engaging members 76, 76 instead of sectoral members such as 42, 42. The members 76, 76 are provided with guideways 78, 78 at their adjacent edge faces. The main member 80 is formed of a material, such as before described, lighter than that of the jaw engaging members 76, 76 and is cast in place in the manner already described.

In order to provide interlocking engagement between the jaw engaging members 76, 76 and the main member 80, the said jaw engaging members are shown as carrying projecting studs 82, 82 and 84, 84. These studs are entered in threaded holes in the jaw engaging members and they may be headless. The said studs project from faces of the members other than the front faces and other than the guideway faces, the studs 82, 82 projecting rearward from the rear faces and the studs 84, 84 projecting laterally from the side faces. One or more of the studs 82, 82 and 84, 84 may be omitted and the metal of the main body may be caused to flow into and fill the threaded holes as illustrated in Fig. 3A.

The construction shown in Figs. 9 and 10 is generally similar to that shown in Figs. 7 and 8, but it differs as to the particular provision for effecting interlocking between each jaw engaging member and the main member. The jaw engaging member 86 as shown in Figs. 9 and 10 does not have studs projecting therefrom but in lieu thereof has integral portions formed with faces spaced from the front faces and spaced from the guideway face and positioned for interlocking engagement with the main member. Specifically, the jaw engaging member 86 is provided with two or more diagonal holes 88, 88 which extend from the side face of the member to the rear face thereof. When the main member 90 is cast in place the metal thereof flows into the holes 88, thus providing firm interlocking engagement between the jaw engaging member and the main member.

The construction shown in Fig. 11 is similar to that shown in Figs. 9 and 10 but in lieu of diagonal holes such as 88, 88 the jaw engaging member 92 is provided with longitudinally extending dovetail faces which are spaced from the front face of the member and which are spaced from the guideway face thereof. Specifically the dovetail faces referred to are the faces of a longitudinally extending T-slot 94 which is formed in the member 92. When the main member 96 is cast in place the metal thereof flows into the T-slot 94 to form interlocking engagement between the jaw engaging member and the main member.

The construction shown in Fig. 12 is similar to that shown in Fig. 11 but the jaw engaging member 98 has a transverse longitudinally extending projection 100 thereon, the faces of the transverse projection 100 constituting the longitudinally extending dovetail faces. When the main member 102 is cast in place the metal thereof flows around the transverse projection 100 and engages the longitudinal faces thereof to provide interlocking engagement between the jaw engaging member and the main member.

The construction shown in Fig. 13 is in some respects similar to the construction shown in Fig. 12. The jaw engaging member 104 has a transverse longitudinally extending projection 106 at the face thereof opposite the guideway face. The transverse projection 106 has diverging front and rear faces. When the main member 108 is cast in place the metal thereof flows around the projection 106 and engages the diverging faces thereof to provide interlocking engagement between the jaw engaging member and the main member. In order to supplement the interlocking engagement provided by the diverging faces on the projection 106 the said projection 106 may have one or more pins 110, preferably tapered, extending transversely through a hole or holes therein. Each pin 110 engages the metal of the main body 108 to additionally hold the jaw engaging member 104 in place. The pins 110 may be inserted in the projection 106 before the main body 108 is cast. Alternately, however, the member 108 may be cast without the pins 110 in place. After casting, holes may be drilled through the main member 108 and through the projection 106, the pins 110 being thereafter driven into the holes. After the pins 110 have been driven into place the metal of the main body 108 may be peened over as indicated at 112 to lock the pins in place.

What I claim is:

1. A generally cylindrical body for a chuck having radially movable jaws which body has a central opening therein and comprises in combination, a jaw engaging structure having an exposed face at the front and having its major portion formed of a hard relatively heavy metal, the said major portion of the jaw engaging structure being provided at edge faces thereof with a plurality of pairs of oppositely disposed complemental guideways for the respective jaws which guideways are generally radial and have their outer ends at the periphery of the body, and a peripherally cylindrical main member formed of a metal lighter than that of the said major portion of the jaw engaging structure and cast in place to provide interlocking engagement with the said jaw engaging structure at positions spaced from the said guideways so that the said jaw engaging structure and the said main member are permanently held in fixed relationship with each other, the said main member including a continuous peripherally cylindrical annular portion behind the said jaw engaging structure.

2. A generally cylindrical body for a chuck having radially movable jaws which body has a central opening therein and comprises in combination, a plurality of separate jaw engaging members each having exposed faces at the front and formed of a hard relatively heavy metal, the said jaw engaging members being provided at edge faces thereof with a plurality of pairs of oppositely disposed complemental guideways for the respective jaws which guideways are generally radial and have their outer ends at the periphery of the body, and a peripherally cylindrical main member formed of a metal lighter than that of the said jaw engaging members and cast in place to provide interlocking engagement with the said jaw engaging members at positions spaced from the said guideways so that the said jaw engaging members and the said main member are permanently held in fixed relationship with each other, the said main member including a continuous peripherally cylindrical annular portion behind the said jaw engaging structure.

3. A generally cylindrical body for a chuck having radially movable jaws which body comprises in combination, a jaw engaging structure having an exposed face at the front and having its major portion formed of a hard relatively heavy metal and provided at edge faces thereof with a plurality of pairs of oppositely disposed complemental guideways for the respective jaws which guideways are generally radial and have their outer ends at the periphery of the body, the said jaw engaging structure also including anchoring studs which are connected with the said major portion thereof and which project from faces of the said major portion other than the front face and other than the guideway faces and which have surfaces arranged for interlocking, and a main member formed of a metal lighter than that of the said major portion of the jaw engaging structure and cast in place around the interlocking surfaces of the anchoring studs to provide permanent interlocking connection with the jaw engaging structure so that the said structure and the said main member are permanently held in fixed relationship with each other.

4. A generally cylindrical body for a chuck having radially movable jaws which body comprises in combination, a jaw engaging structure having an exposed face at the front and having its major portion formed of a hard relatively heavy metal and provided at edge faces thereof with a plurality of pairs of oppositely disposed complemental guideways for the respective jaws which guideways are generally radial and have their outer ends at the periphery of the body, the said jaw engaging structure also including anchoring studs which are connected with the said major portion thereof and which project rearwardly from the rear of the said major portion and which have surfaces arranged for interlocking, and a main member formed of a metal lighter than that of the said major portion of the jaw engaging structure and cast in place around the interlocking surfaces of the anchoring studs to provide permanent interlocking connection with the jaw engaging structure so that the said structure and the said main member are permanently held in fixed relationship with each other.

5. A generally cylindrical body for a chuck having radially movable jaws which body comprises in combination, a plurality of similar separate jaw engaging members formed of a hard relatively heavy metal, the said jaw engaging members having exposed faces at the front and being spaced apart and shaped at their adjacent edge faces to provide a plurality of pairs of generally radial guideways for the respective jaws, a plurality of anchoring studs connected respectively with the said jaw engaging members which studs project from the rear faces of the said members and have surfaces arranged for interlocking, and a main member formed of a metal lighter than that of the jaw engaging members and cast in place around the interlocking surfaces of the projecting studs to provide permanent interlocking connection with the jaw engaging members so that the said jaw engaging members and the said main member are permanently held in fixed relationship with each other.

6. A generally cylindrical body for a chuck having radially movable jaws which body has a central opening therein and comprises in combination, a plurality of similar separate sectoral jaw engaging members formed of a hard relatively heavy metal, the said sectoral members being spaced apart and shaped at their adjacent edge faces to provide a plurality of pairs of generally radial guideways for the respective jaws and the front faces of the said sectoral members constituting portions of the front face of the chuck body, and a main member formed of a meal lighter than that of the jaw engaging members and cast in place to provide permanent interlocking connection with the jaw engaging members at positions spaced from the said guideways so that the said jaw engaging members and the said main member are permanently held in fixed relationship with each other, the said main member including a continuous annular portion behind the sectoral jaw engaging members.

7. A generally cylindrical body for a chuck having radially movable jaws which body has a central opening therein and comprises in combination, a plurality of similar separate sectoral jaw engaging members formed of a hard relatively heavy metal which members are spaced apart and shaped at their adjacent edge faces to provide a plurality of pairs of generally radial guideways for the respective jaws, the front faces of the said sectoral members constituting portions of the front face of the chuck body and the said sectoral members having large openings therein extending from front to rear, and a main member formed of a metal lighter than that of the jaw engaging members and cast in place to provide permanent interlocking connection with the jaw engaging members at positions spaced from the said guideways so that the said jaw engaging members and the said main member are permanently held in fixed relationship with each other, the said main member including a continuous annular portion behind the sectoral jaw engaging members and the said main member also including portions which extend into and fill the said large openings in the sectoral jaw engaging members.

8. A generally cylindrical body for a chuck having radially movable jaws which body has a central opening therein and comprises in combination, a jaw engaging structure at the front formed of a hard relatively heavy metal and provided at edge faces thereof with a plurality of pairs of generally radial guideways for the respective jaws which guideways having their outer ends at the periphery of the body, a main member formed of a metal lighter than that of the jaw engaging structure and cast in place to provide interlocking engagement with the said jaw engaging structure at positions spaced from the said guideways so that the said jaw engaging structure and the said main member are permanently held in fixed relationship with each other, the said main member including a continuous annular portion behind the said jaw engaging structure which annular portion has an annular recess therein open at the rear and adapted for receiving an annular scroll member, and a ring at the inner edge of the annular recess and formed of a metal different from that of the main member which ring is adapted to provide a bearing for the said scroll member.

9. A generally cylindrical body for a chuck having radially movable jaws which body comprises in combination, a unitary jaw engaging member at the front formed of a hard relatively heavy metal and including a plurality of integral radial arms provided with pairs of generally radial guideways for the respective jaws, and a peripherally cylindrical main member formed of a metal lighter than that of the jaw engaging member and cast in place to provide connection with the said jaw engaging member at the sides of the radial arms thereof so that the said jaw engaging member and the said main member are permanently held in fixed relatioinship with each other, the said main member including a continuous annular portion behind the said jaw engaging member.

10. A generally cylindrical body for a chuck having radially movable jaws which body comprises in combination, a unitary jaw engaging member at the front formed of a hard relatively heavy metal and including a plurality of integral radial arms provided with pairs of generally radial guideways for the respective jaws, a plurality of anchoring studs connected respectively with the said arms of the jaw engaging member which studs have surfaces arranged for interlocking, and a peripherally cylindrical main member formed of a material lighter than that of the jaw engaging member and cast in place between the said arms and around the said studs so that the said jaw engaging member and the said main member are permanently held in fixed relationship with each other, the said main member including a continuous annular portion behind the said jaw engaging member.

11. A generally cylindrical body for a chuck having radially movable jaws which body comprises in combination, a unitary jaw engaging member at the front formed of a hard relatively heavy metal and including a plurality of integral radial arms provided with pairs of generally radial guideways for the respective jaws, a plurality of anchoring studs connected respectively with the said arms of the jaw engaging member which studs on each arm project transversely in opposite directions therefrom and have surfaces arranged for interlocking, and a peripherally cylindrical main member formed of a material lighter than that of the jaw engaging member and cast in place between the said arms and around the said studs so that the said jaw engaging member and the said main member are permanently held in fixed relationship with each other, the said main member including a continuous annular portion behind the said jaw engaging member.

12. A generally cylindrical body for a chuck having radially movable jaws which body comprises in combination, a unitary jaw engaging member at the front formed of a hard relatively heavy metal and including a plurality of integral radial arms provided with pairs of generally radial guideways for the respective jaws, the said jaw engaging member including a rearward projecting central portion having an outward facing cylindrical surface, and a peripherally cylindrical main member formed of a metal lighter than that of the jaw engaging member and cast in place to provide connection with the said jaw engaging member at the sides of the radial arms thereof so that the said jaw engaging member and the said main member are permanently held in fixed relationship with each other, the said main member including a continuous annular portion behind the said jaw engaging member and the said main member having an annular recess therein which is open at the rear and adapted for receiving an annular scroll member and which is bounded at its inner edge by the said cylindrical surface on the rearward projecting portion of the jaw engaging member.

13. A generally cylindrical body for a chuck having radially movable jaws which body has a central opening therein and comprises in combination, a plurality of pairs of similar separate jaw engaging members at the front formed of a hard relatively heavy metal, the said jaw engaging members of each pair being spaced apart and shaped at their adjacent edge faces to provide a pair of generally radial guideways for a corresponding jaw, and a peripherally cylindrical main member formed of a metal lighter than that of the jaw engaging members and cast in place between and behind the said pairs of jaw engaging members to provide permanent interlocking engagement with the said jaw engaging members so that the said pairs of jaw engaging members and the said main member are permanently held in fixed relationship with each other.

14. A generally cylindrical body for a chuck having radially movable jaws which body has a central opening therein and comprises in combination, a plurality of pairs of similar separate jaw engaging members at the front formed of a hard relatively heavy metal, the said jaw engaging members of each pair being spaced apart and shaped at their adjacent edge faces to provide a pair of generally radial guideways for a corresponding jaw, a plurality of anchoring studs respectively connected with the said members of each pair which studs on the members of each pair project transversely in opposite directions therefrom and have surfaces arranged for interlocking, and a peripherally cylindrical main member formed of a metal lighter than that of the jaw engaging members and cast in place between and behind the said pairs of jaw engaging members and around the said studs to provide permanent interlocking connection with the said jaw engaging members so that the said pairs of jaw engaging members and the said main member are permanently held in fixed relationship with each other.

15. A generally cylindrical body for a chuck having radially movable jaws which body has a central opening therein and comprises in combination, a plurality of pairs of similar separate jaw engaging members at the front formed of a hard relatively heavy metal, the said jaw engaging members of each pair being spaced apart and shaped at their adjacent edge faces to provide a pair of generally radial guideways for a corresponding jaw, a plurality of anchoring studs respectively connected with the said members of each pair which studs on the members of each pair project transversely in opposite directions therefrom and have surfaces arranged for interlocking, a second plurality of studs respectively connected with the said members of each pair which studs project rearward from the respective members and have surfaces arranged for interlocking, and a peripherally cylindrical main member formed of a metal lighter than that of the jaw engaging members and cast in place between and behind the said pairs of jaw engaging members and around the said studs to provide permanent interlocking connection with the said jaw engaging members so that the said pairs of jaw engaging members and the said main member are permanently held in fixed relationship with each other.

16. A generally cylindrical body for a chuck having radially movable jaws which body has a central opening therein and comprises in combination, a plurality of pairs of similar separate jaw engaging members at the front formed of a hard relatively heavy metal, the said jaw engaging members of each pair being spaced apart and shaped at their adjacent edge faces to provide a pair of generally radial guideways for a corresponding jaw and each jaw engaging member having an integral portion formed with faces spaced from the front face and spaced from the guideway face and positioned for interlocking engagement, and a peripherally cylindrical main member formed of a metal lighter than that of the jaw engaging members and cast in place between and behind the said pairs of jaw engaging members and in engagement with the said interlocking faces of the said jaw engaging members so that the said pairs of jaw engaging members and the said main member are permanently held in fixed relationship with each other.

17. A generally cylindrical body for a chuck having radially movable jaws which body has a central opening therein and comprises in combination, a plurality of pairs of similar separate jaw engaging members at the front formed of a hard relatively heavy metal, the said jaw engaging members of each pair being spaced apart and shaped at their adjacent edge faces to provide a pair of generally radial guideways for a corresponding jaw and each jaw engaging member having an integral portion formed with dovetail faces extending longitudinally of the member which dovetail faces are spaced from the front face and spaced from the guideway face and positioned for interlocking engagement, and a peripherally cylindrical main member formed of a metal lighter than that of the jaw engaging members and cast in place between and behind the said pairs of jaw engaging members and in engagement with the said interlocking dovetail faces of the said jaw engaging members so that the said pairs of jaw engaging members and the said main member are permanently held in fixed relationship with each other.

18. A generally cylindrical body for a chuck having radially movable jaws which body has a central opening therein and comprises in combination, a plurality of pairs of similar separate jaw engaging members at the front formed of a hard relatively heavy metal, the said jaw engaging members of each pair being spaced apart and shaped at their adjacent edge faces to provide a pair of generally radial guideways for a corresponding jaw and each jaw engaging member having a transversely projecting integral portion formed with dovetail faces extending longitudinally of the member which projecting portion is spaced from the front face and spaced from the guideway face with the said dovetail faces thereof positioned for interlocking engagement, and a peripherally cylindrical main member formed of a metal lighter than that of the jaw engaging members and cast in place between and behind the said pairs of jaw engaging members and in engagement with the said interlocking dovetail faces on the projecting portion of the said jaw engaging members so that the said pairs of jaw engaging members and the said main member are permanently held in fixed relationship with each other.

19. A generally cylindrical body for a chuck having radially movable jaws which body has a central opening therein and comprises in combination, a plurality of pairs of similar separate jaw engaging members at the front formed of a hard relatively heavy metal, the said jaw engaging members of each pair being spaced apart and shaped at their adjacent edge faces to provide a pair of generally radial guideways for a corresponding jaw and each jaw engaging member having a laterally projecting integral portion formed with diverging faces extending longitudinally of the member which laterally projecting portion is at the side opposite the guideway face with the said diverging faces thereof positioned for interlocking engagement, a peripherally cylindrical main member formed of a metal lighter than that of the jaw engaging members and cast in place between and behind the said pairs of jaw engaging members and in engagement with the said diverging faces on the projecting portion of the said jaw engaging members so that the said pairs of jaw engaging members and the said main member are permanently held in fixed relationship with each other, and a pin extending through the said projecting portion of each jaw engaging member and engaged with the metal of the main body.

DONALD B. HUNTTING.

REFERENCES CITED

The following references are of record in the file of this patent:

UNITED STATES PATENTS

| Number | Name | Date |
|---|---|---|
| 1,007,132 | Miller | Oct. 31, 1911 |
| 1,046,523 | Whiton | Dec. 10, 1912 |
| 1,713,801 | Whiton | May 21, 1929 |
| 1,794,511 | Bush | Mar. 3, 1931 |
| 2,482,841 | Cooper | Sept. 27, 1949 |

FOREIGN PATENTS

| Number | Country | Date |
|---|---|---|
| 186,935 | Great Britain | Nov. 15, 1928 |